US009630259B2

(12) United States Patent
Chen

(10) Patent No.: US 9,630,259 B2
(45) Date of Patent: Apr. 25, 2017

(54) DRILLING AND TAPPING MACHINE

(71) Applicant: RuiAn RezPack Machinery Co., Ltd., Ruian, Zhejiang (CN)

(72) Inventor: Yu Chen, Ruian (CN)

(73) Assignee: RuiAn RezPack Machinery Co., Ltd., Ruian, Zhejiang (CN)

( * ) Notice: Subject to any disclaimer, the term of this patent is extended or adjusted under 35 U.S.C. 154(b) by 122 days.

(21) Appl. No.: 14/670,410

(22) Filed: Mar. 27, 2015

(65) Prior Publication Data

US 2016/0279715 A1 Sep. 29, 2016

(51) Int. Cl.
*B23B 41/14* (2006.01)
*B23B 39/00* (2006.01)
*B23G 1/18* (2006.01)
*B23Q 11/00* (2006.01)
*B23Q 5/32* (2006.01)
(Continued)

(52) U.S. Cl.
CPC .............. *B23B 39/00* (2013.01); *B23G 1/18* (2013.01); *B23Q 11/0017* (2013.01); *B23B 41/14* (2013.01); *B23B 2250/04* (2013.01); *B23B 2260/004* (2013.01); *B23B 2260/044* (2013.01); *B23Q 5/32* (2013.01); *B23Q 5/345* (2013.01); *B23Q 5/347* (2013.01); *B25H 1/0021* (2013.01); *B25H 1/0028* (2013.01); *B25H 1/0042* (2013.01); *Y10T 408/564* (2015.01); *Y10T 408/5647* (2015.01); *Y10T 408/5653* (2015.01); *Y10T 408/637* (2015.01); *Y10T 408/675* (2015.01); *Y10T 408/6786* (2015.01)

(58) Field of Classification Search
CPC .......... Y10T 408/564; Y10T 408/5647; Y10T 408/5653; Y10T 408/6786; Y10T 408/675; Y10T 408/643; Y10T 408/637; B25H 1/0021; B25H 1/0028; B25H 1/0042; B23B 41/14; B23Q 5/32; B23Q 5/347; B23Q 5/345
USPC ........................................ 408/123, 128, 235
See application file for complete search history.

(56) References Cited

U.S. PATENT DOCUMENTS 1,674,669 A * 6/1928 Stedman ............ B23Q 11/0017
144/104
1,699,870 A * 1/1929 Black .................... B23B 45/008
173/13
(Continued)

FOREIGN PATENT DOCUMENTS

DE 2420273 A * 11/1975

*Primary Examiner* — Daniel Howell
*Assistant Examiner* — Yasir Diab
(74) *Attorney, Agent, or Firm* — Raymond Y. Chan; David and Raymond Patent Firm

(57) ABSTRACT

A drilling and tapping machine includes a power head assembly supported at a vertical orientation, a parallelogram arm structure including a head support and an arm base, and an arm positioning assembly coupled with the head support and the arm base support for guiding corresponding movements of the head support and the arm base support so as to ensure a vertical trajectory of the power head assembly. The machine further includes a counterweight configuration to vertically move the power head assembly via a lever. The machine further includes an operational control assembly to selectively shift the power head assembly between a drilling operation and tapping operation. Therefore, the machine is suitable to make a hole with a diameter of 0.5 to 3 mm.

17 Claims, 5 Drawing Sheets

(51) Int. Cl.
*B25H 1/00* (2006.01)
*B23Q 5/34* (2006.01)

(56) References Cited

U.S. PATENT DOCUMENTS

| | | | | |
|---|---|---|---|---|
| 3,364,510 | A * | 1/1968 | Johnson | B23G 1/48 |
| | | | | 408/123 |
| 3,417,953 | A * | 12/1968 | Hillquist | B01L 9/00 |
| | | | | 248/284.1 |
| 3,552,239 | A * | 1/1971 | Yeaman | B25H 1/0057 |
| | | | | 408/103 |
| 4,782,726 | A * | 11/1988 | Ryder | B23P 19/06 |
| | | | | 81/57.24 |
| 5,544,554 | A * | 8/1996 | Brightly | B25H 1/0028 |
| | | | | 29/240 |
| 5,890,690 | A * | 4/1999 | Klintberg | B25H 1/0021 |
| | | | | 248/276.1 |
| 5,971,677 | A * | 10/1999 | Lan | B23B 39/12 |
| | | | | 408/236 |
| 6,711,972 | B1 * | 3/2004 | Joyner | B25H 1/0021 |
| | | | | 81/57.24 |
| 7,789,353 | B2 * | 9/2010 | Koerlin | B25H 1/0035 |
| | | | | 173/141 |
| 2004/0118577 | A1 * | 6/2004 | Morissette | B25D 17/28 |
| | | | | 173/38 |
| 2006/0186281 | A1 * | 8/2006 | Thiessen | B25H 1/0021 |
| | | | | 248/123.11 |

\* cited by examiner

DRILLING AND TAPPING MACHINE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a machine, and more particular to a drilling and tapping machine, which can stably control a downward movement of a drilling head for precisely drilling a hole with a diameter range of 0.5 to 3 mm.

Description of Related Arts

A drilling and tapping machine generally comprises a drilling head for making a hole on a workpiece through a drilling process or a tapping process. Generally speaking, there are two types of drilling and tapping machine, i.e. are a cantilever type drilling and tapping machine and a desktop type drilling and tapping machine.

Comparing with the cantilever type drilling and tapping machine with the desktop type drilling and tapping machine, the cantilever type drilling and tapping machine provides a bigger working area and an increases the flexibility of operation. In particular, the cantilever type drilling and tapping machine provides a 360° working area to drill a hole on an object or workpiece therewithin. However, the major backward of the cantilever type drilling and tapping machine is that the drilling head thereof can only make a bigger hole through the drilling process and tapping process. In other words, the cantilever type drilling and tapping machine cannot make a hole smaller than 3 mm. In fact, it is impossible for the cantilever type drilling and tapping machine to make a hole with a diameter of 0.5 mm. On the other hand, only the desktop type drilling and tapping machine with very high accuracy configuration can make a hole with 0.5 mm diameter. Accordingly, the high quality desktop type drilling and tapping machine has complicated structural configuration to perform the precise hole drilling operation. The cost, including the operational cost and maintenance cost, of high quality desktop type drilling and tapping machine is expensive. Accordingly, there are two major factors that the cantilever type drilling and tapping machine cannot make such a small hole. The first factor is that during the tapping operation, the powered drilling head must be moved vertically. The drill and tap of the drilling head are forced by a transverse pulling force through other components of the machine in order to ensure the vertical movement of the drilling head. Since the diameters of the drill and tap of the drilling head are relatively small to drill the small hole, the transverse pulling force applied at the drilling head will easily break the drill and tap during the tapping operation. The second factor is that the machine (for both cantilever type drilling and tapping machine and desktop type drilling and tapping machine) must incorporate a retracting device with the drilling head in order to upwardly move back the drilling head to its original position after the tapping operation is completed. The retracting device can be a gas spring or a coil spring to apply a retracting force, i.e. a spring force, to the drilling head. However, the retracting force is relatively large in order to lift up the drilling head. A larger size drill can withdraw such large retracting force when a bigger hole is formed. However, a smaller size drill can be easily broken by the large retracting force or when the drilling head is rapidly lifted up. In other words, if the machine is required for making a small hole, such as 0.5-3 mm, the large retracting force will break the drilling head easily and will damage the threaded portion of the hole as well. Therefore, it is difficult to make a small hole with the conventional machine.

The conventional drilling and tapping machine further comprises a handle for controlling a movement of the drilling head, such that when the handle is actuated, the drilling head is dropped down to drill a hole on a workpiece through a drilling process or a tapping process. For drilling hole with a diameter between 0.5 mm and 3 mm, a screw tap at the drilling head is small in diameter. In other words, a key factor for drilling such small hole is that the drilling head must be dropped down slowly and stably. Therefore, the handle must be actuated to apply the small and stable controllable pressure to the drilling head. As the small and stable controllable pressure applying to the drilling head, the small reaction force will be generated by the screw tap and will be transmitted back to the handle. Therefore, if the pressure is large enough, a large reaction force will be generated, which will break the screw tap instantly. Furthermore, after the drilling hole is formed, the handle must be pulled back to its original position by the returning force, so as to withdraw the screw tap from the drilling hole. If the returning force is too small, the screw tap cannot be pulled upwardly to withdraw from the drilling hole. If the returning force is too large, the screw tap will be broken before the screw tap is withdrawn from the drilling hole. In other words, the returning force cannot be precisely controlled by the operator. The conventional drilling machine generally equips with a gear transmission control to transmit the pivotal movement of the handle to the downward movement of the drilling head. Accordingly, the gear transmission control comprises a rack and pinion structure, such that the pivotal movement of the handle is transmitted to the downward movement of the drilling head via a gear ratio of the rack and pinion structure. However, the major drawback of the rack and pinion structure is that it cannot precisely transmit the small and stable controllable pressure from the handle to the drilling head. In other words, the operator must apply a relatively large actuating force at the handle to actuate the handle. As a result, the pressure applied to the drilling head cannot be precisely controlled. As it is mentioned above, the large reaction force will be generated to break the screw tap by the large pressure at the handle. Therefore, the rack and pinion structure is not suitable for drilling and tapping machine to drill a small drilling hole with a diameter between 0.5 mm and 3 mm. In order to drill the small drilling hole, the conventional drilling and tapping machine must be operated slowly to drop down the drilling head at a very slow speed. The conventional drilling and tapping machine cannot be rapidly shifted between the drilling operation and the tapping operation.

Furthermore, the conventional drilling and tapping machine further comprises base support and a swing arm movably extended from the base support for positioning the drilling head to align with the workpiece. However, there is no locking mechanism to lock up the relative movement between the base support and the swing arm. As a result, during the operation of the drilling head, the vibration of the drilling head will transmit to the base support through the swing arm, such that the drilling head will misaligned with the workpiece by the unwanted movement between the swing arm and the base support.

SUMMARY OF THE PRESENT INVENTION

The invention is advantageous in that it provides a drilling and tapping machine, which employs a parallelogram arm structure to ensure the vertical movement of the power head assembly and a counterweight configuration to balance and control the vertical movement of the power head assembly, such that the machine is suitable and specially designed for making a hole with a diameter between 0.5 and 3 mm during the tapping operation and drilling operation. The machine of the present invention is a cantilever type drilling and tapping machine suitable for making a hole with a diameter between 0.5 and 3 mm.

The invention is further advantageous in that it provides an operational control assembly for a drilling and tapping machine, which can stably control a downward movement of a drilling power head for precisely drilling a hole within a diameter range of 0.5 to 3 mm. The operator is able to apply a relatively small actuating force at the handle to precisely control the movement of the drilling power head for drilling the small hole. Therefore, the drilling and tapping machine can be rapidly shifted between the drilling operation and the tapping operation.

Additional advantages and features of the invention will become apparent from the description which follows, and may be realized by means of the instrumentalities and combinations particular point out in the appended claims.

According to the present invention, the foregoing and other objects and advantages are attained by a drilling and tapping machine comprising a power head assembly supported at a vertical orientation, a head support comprising an upper head supporting arm and a lower head supporting arm, and a supporting shaft supported at a vertical orientation, wherein the upper and lower head supporting arms are pivotally and spacedly coupled between the power head assembly and the supporting shaft to form a parallelogram. The machine further comprises an arm base support which comprises a first base supporting arm, a second base supporting arm, a first base supporting platform and a second base supporting platform. The first base supporting arm and the second base supporting arm are pivotally coupled between the first base supporting platform and the second base supporting platform, such that the first base supporting arm, the second base supporting arm, the first base supporting platform, and the second base supporting platform also form a parallelogram. The machine further comprises an arm positioning assembly which comprises a guiding member, having an arc-shaped guiding slot, coupled at the second base supporting platform, a bearing unit operatively provided in the guiding slot, a guiding axle operatively extended through the bearing unit to slidably couple at the guiding slot, and a control arm extended from the guiding axle to the lower head supporting arm. Accordingly, the second base supporting platform is stationary that when the guiding axle is slid along the guiding slot to actuate the control arm, the first and second base supporting arms are pivotally and correspondingly moved while the upper and lower head supporting arms are pivotally and correspondingly moved to ensure the power head assembly to be absolutely moved at a vertical orientation and to ensure the vertical trajectory of the power head assembly.

Another advantage of the invention is to provide a drilling and tapping machine, wherein through the parallelogram arm structure, the power head assembly is controllably and absolutely moved at a vertical orientation during the tapping operation for making a hole with a diameter between 0.5 and 3 mm. As a result, no transverse force will be exerted to the drill and tap at the power head assembly during the tapping operation or the drilling operation. The parallelogram arm structure of the present invention will ensure and maintain the power head assembly in a vertically movable orientation. In other words, the parallelogram arm structure of the present invention will correct the deviated orientation of the power head assembly. Since the movement of the parallelogram arm structure is controlled and guided by the guiding slot, the arms in the parallelogram arm structure will be synchronizedly moved to ensure the vertical trajectory of the power head assembly Another advantage of the invention is to provide a drilling and tapping machine, wherein through the counterweight configuration of the present invention, the power head assembly is lifted up back to its original position via the action of the lever after the tapping operation or the drilling operation. Since the leverage moment of the lever arm at the weighting wheel can be set to slightly larger than the leverage moment of the lever arm at the power head assembly, the power head assembly is lifted up slowly by a relatively small returning force for the tapping operation or the drilling operation. In other words, the returning force at the power head assembly will be small and stable to prevent the screw and tap being broken after the small hole with a diameter from 0.5 to 3 mm is formed.

Another advantage of the invention is to provide a drilling and tapping machine, wherein the weight of the weighting wheel can be selectively adjusted via a weight adjustment unit so as to configure the weighting wheel with an eccentric weight. By selectively adjusting the counterweight at one end of the lever, an optimized returning force at the power head assembly can be determined for different sizes of hole during the tapping operation or the drilling operation.

Another advantage of the invention is to provide a drilling and tapping machine, wherein the weight of the weighting wheel can be selectively adjusted at different weight levels via a weight indexing unit. The weight indexing unit comprises an indexing spring holder having a cavity coupled at the control arm, an indexing spring disposed in the indexing spring holder, an indexing element having a ball shape disposed at the indexing spring holder and supported by the indexing spring, and a plurality of indexing indentions spacedly and radially formed at the surface of the weighting wheel. Accordingly, the indexing element is pushed by the indexing spring holder to bias against the surface of the weighting wheel at one of the indexing indentions to index the position of the weighting wheel. Therefore, when the weighting wheel is rotated, the indexing element is pushed by the indexing spring holder to disengage with one of the indexing indentions and to reengage with another indexing indention, so as to index the weight level of the weighting wheel. In other words, the counterweight of the lever can be finely adjusted to finely control the leverage moment thereof.

Another advantage of the invention is to provide a drilling and tapping machine, wherein the weight adjustor comprises a weight adjusting handwheel, a weight adjusting seat, a weight adjusting spring, a weight adjusting shaft, and a weight adjusting clutch 32. The weight adjusting seat is coupled at a machine housing at an exterior side thereof, wherein the weight adjusting handwheel is rotatably and slidably coupled at the weight adjusting seat. The weight adjusting spring is supported between the weight adjusting seat and the weight adjusting handwheel, wherein the weight adjusting spring has two ends biasing against the weight adjusting seat and the weight adjusting handwheel respectively. The weight adjusting clutch, having at least two weight adjusting latches, is located at an interior side of the machine housing at a position that the weight adjusting latches are extended toward the weighting wheel, wherein the weight adjusting shaft is extended from the weight adjusting handwheel to the weight adjusting clutch through the weight adjusting seat and the machine housing. In particular, the weight adjusting spring is coaxially coupled at the weight adjusting shaft. The weight adjustor further has at least two weight adjusting slots formed at the surface of the weighting wheel. Accordingly, the two weight adjusting latches have different lengths that one of the weight adjusting latches (long weight adjusting latch) is longer than the length of another weight adjusting latch (short weight adjusting latch). Correspondingly, the weight adjusting slots have different length that one of the weight adjusting slots (long weight adjusting slot) is longer than the length of another weight adjusting slot (short weight adjusting slot). When the long weight adjusting latch is inserted into the long weight adjusting slot, the short weight adjusting latch will be automatically aligned with and inserted into the short weight adjusting slot. According to the preferred embodiment, when the weight adjusting handwheel is pushed by the operator to push the weight adjusting clutch to the weighting wheel, the weight adjusting latches are correspondingly engaged with the weight adjusting slots, so as to engage the weight adjusting clutch with the weighting wheel. Then, the weight adjusting handwheel is rotated to drive the weighting wheel to rotate to control the weight distribution of the weighting wheel. The weight distribution of the weighting wheel can be indicated by the weight distribution dial. The lever moment of the weighting wheel is corresponding to the rotational position thereof. The rotational position of the weighting wheel is corresponding to the indicators at the weight distribution dial.

Another advantage of the invention is to provide a drilling and tapping machine, wherein a locking mechanism is arranged for selectively locking the swing arm at the arm base support. Accordingly, the locking mechanism comprises a threaded locking base, a threaded adjusting shaft, and a locking sleeve. The locking sleeve is coupled at the second base supporting platform. The threaded locking base is coupled at the swing arm, wherein the swing arm is movable with respect to the threaded locking base. A bearing device is supported at a horizontal orientation and is located between a bottom side of the locking sleeve and an upper side of the threaded locking base to enable the rotational movement of the locking sleeve on the threaded locking base. Accordingly, an upper portion of the threaded locking base has a sleeve portion to define a shoulder portion where the bearing device is supported thereon, wherein the sleeve portion is coaxially received in the locking sleeve. A shaft bearing is coaxially coupled between an inner surface of the locking sleeve and an outer surface of the sleeve portion of the threaded locking base to enable the sleeve portion to be rotated within the locking sleeve. The threaded locking base further has a plurality of through locking holes formed at the sleeve portion above the bearing device, wherein a plurality of locking elements are located at the locking holes of the sleeve portion respectively. The threaded adjusting shaft is rotatably coupled at the threaded locking base and is upwardly extended from the bottom side of the threaded locking base. The locking mechanism further comprises a locking actuator upwardly extended from the top end of the threaded adjusting shaft, wherein the locking actuator has a conical shape that a size of the locking actuator is gradually reduced from bottom to top. The locking actuator is slidably and coaxially coupled within the sleeve portion in a vertical direction along an axis of the sleeve portion. When the threaded adjusting shaft is rotated at one direction, the locking actuator is driven to move upwardly so as to push the locking elements outwardly and radially through the locking holes until the locking elements bias against the inner surface of the locking sleeve. As a result, the locking sleeve is locked up at the threaded locking base, so as to lock up the movement of the swing arm at the second base supporting platform. The advantages of the locking mechanism are (1) the locking/unlocking operation of the locking mechanism is simple and easy to selectively lock up the swing arm, and (2) the swing arm can be freely moved with respect to the arm base support to adjust the position and alignment of the power head assembly.

Another advantage of the invention is to provide a drilling and tapping machine, wherein a swing arm locking assembly is arranged for selectively locking the swing arm with the base station. The swing arm locking assembly has the same structural configuration of the locking mechanism, wherein the swing arm locking assembly also comprises the threaded locking base, the threaded adjusting shaft, and the locking sleeve. The locking sleeve is coupled at the base station. The threaded locking base is coupled at the swing arm, wherein the swing arm is movable with respect to the threaded locking base, such that two end portions of the swing arm are movably coupled with two threaded locking bases of two locking mechanisms respectively. The bearing device of the swing arm locking assembly is supported at a horizontal orientation and is located between an upper side of the locking sleeve and a bottom side of the threaded locking base to enable the rotational movement of the locking sleeve on the threaded locking base. Accordingly, a lower portion of the threaded locking base has a sleeve portion to define a shoulder portion where the bearing device is supported thereat, wherein the sleeve portion is coaxially received in the locking sleeve. The shaft bearing of the swing arm locking assembly is coaxially coupled between an inner surface of the locking sleeve and an outer surface of the sleeve portion of the threaded locking base to enable the sleeve portion to be rotated within the locking sleeve. The threaded locking base further has a plurality of through locking holes formed at the sleeve portion below the bearing device, wherein the locking elements of the swing arm locking assembly are located at the locking holes of the sleeve portion respectively. The threaded adjusting shaft is rotatably coupled at the threaded locking base and is downwardly extended from the bottom side of the threaded locking base. The locking actuator of the swing arm locking assembly is downwardly extended from the bottom end of the threaded adjusting shaft, wherein the locking actuator of the swing arm locking assembly has a conical shape that a size of the locking actuator is gradually reduced from top to bottom. The locking actuator is slidably and coaxially coupled within the sleeve portion in a vertical direction along an axis of the sleeve portion. When the threaded adjusting shaft is rotated at one direction, the locking actuator is driven to move downwardly so as to push the locking elements outwardly and radially through the locking holes until the locking elements bias against the inner surface of the locking sleeve. As a result, the locking sleeve is locked up at the threaded locking base, so as to lock up the movement of the swing arm at the base station. The advantages of the swing arm locking assembly are (1) the locking/ unlocking operation of the locking mechanism is simple and easy to selectively lock up the swing arm, and (2) the swing arm can be freely moved with respect to the base station to adjust the position and alignment of the power head assembly.

In accordance with another aspect of the invention, the present invention comprises an operational control assembly of a drilling and tapping machine which comprises a drilling operational handle, a retention panel, a wheel pulley, a slider member, and a clutch member. The retention panel is coupled at a sidewall of a head casing at an interior thereof and is supported adjacent to the power head assembly, wherein the retention panel has a wheel cavity formed at one side thereof. The wheel pulley is rotatably coupled at the retention panel within the wheel cavity, wherein a handle axle of the drilling operational handle is coaxially coupled with the wheel pulley through the retention panel, such that when the drilling operational handle is pivotally moved with respect to the retention panel, the wheel pulley is driven to rotate within the wheel cavity. A sliding slot is formed at one side of the retention panel to communicate with the wheel cavity, wherein the sliding slot is extended tangentially to the wheel cavity. The slider member is sidably engaged with the sliding slot, such that the slider member is actuated to slide along the sliding slot at a vertical direction. The slider member comprises a connector sidewardly extended therefrom. A tensional cable is supported along the sliding slot in tension manner, wherein the tensional cable has an upper end affixed to the slider member at a bottom portion thereof, and a lower end affixed to the wheel pulley. The clutch member is rotatably coupled on top of the power transmission head base. The clutch member further has a clutch slot formed at a lateral side thereof, wherein the connector is selectively engage with the clutch slot. Accordingly, before the drilling position of the drilling head, i.e. the clutch member is stationary before the rotation thereof, the connector is engaged with the clutch slot by inserting the connector thereinto. After the tapping position of the drilling head, i.e. after the rotation of the clutch member, the connector is disengaged with the clutch slot.

Another advantage of the invention is to provide an operational control assembly, wherein the operator is able to apply a relatively small actuating force at the drilling operational handle to drop down the drilling power head, so as to generate a small and stable controllable pressure at the drilling power head to drill the hole and a small returning force at the drilling operational handle after the hole is formed. It is suitable for the drilling and tapping machine to drill the hole within a diameter range of 0.5 to 3 mm.

The operation of the operational control assembly is illustrated as follows. At the drilling position of the clutch member, the connector is engaged with the clutch slot. When the drilling operational handle is pivotally moved by the hand of the operator, the wheel pulley is driven to rotate. The slider member is slid downwardly along the sliding slot by the tensional cable, so as to drive the power drilling head to move downward for tapping operation. Since the downward pressure of the drilling head can be directly transmitted to the drilling operational handle via the tensional cable, the operator can feel and control the downward pressure at the drilling operational handle. In other words, the operator is able to apply a relatively light actuating force at the drilling operational handle to pivotally pull the drilling operational handle to generate a relatively small and stable controllable pressure to the drilling head, which is suitable for operating the tap to drill a drilling hole with a diameter from 0.5 to 3 mm on a workpiece. Once the drilling hole is formed, the drilling operational handle can be easily and lightly moved back to its original position. It is because the returning force is very limited via the tensional cable and the wheel pulley. Due to the tension of the tensional cable, the returning force at the drilling head will be small and stable to prevent the tap being broken after the small hole with a diameter from 0.5 to 3 mm is formed.

Another advantage of the invention is to provide an operational control assembly, which comprises a rotation adjustor coupled at a top side of the head casing for controllably adjusting a rotational position of the clutch member. The rotation adjustor comprises a hand wheel, a wheel base, a resilient element, an adjusting shaft, and a coupling base. The wheel base is coupled at the top side of the head casing to coaxially align with the clutch member. The hand wheel is rotatably coupled at the wheel base. The resilient element is supported within the wheel base at a position that an upper end of the resilient element is biased against a bottom of the hand wheel while a lower end of the resilient element is biased against a bottom wall of the wheel base. The adjusting shaft is coaxially extended from the wheel base to the coupling base through the wheel base, wherein the adjusting shaft is coaxially extended through the resilient element. The bottom side of the coupling base is coaxially aligned and faced toward the upper side of the clutch member. The coupling base comprises a plurality of coupling latches spacedly and downwardly extended from the bottom side of the coupling base, wherein the clutch member further has a plurality of corresponding coupling slots spacedly formed on the upper side of the clutch member, such that the coupling latches are engaged with the coupling slots respectively so as to couple the hand wheel with the clutch member. Accordingly, in order to adjust the rotational position of the clutch member, the hand wheel is manually pressed down to couple the coupling latches with the coupling slots, such that the hand wheel is rotated to drive the clutch member to rotate. It is worth mentioning that the before and after rotational positions of the clutch member is shown at the position indicators of the hand wheel.

Another advantage of the invention is to provide an operational control assembly, which comprises a positioning unit for positioning the clutch member, wherein the positioning unit comprises a spring element and a positioning element supported on the spring element. The positioning unit further has two positioning slots spacedly formed at the bottom side of the clutch member, and a receiving slot formed at the upper side of the power transmission head base, wherein the spring element and the positioning element are received in the receiving slot, such that the positioning element is upwardly pushed by the spring element to bias against the bottom side of the clutch member at one of the positioning slots. As a result, the clutch member can be rapidly shifted its position between the drilling position and the tapping position.

Another advantage of the invention is to provide an operational control assembly, wherein the clutch member has a circular engaging slot formed at a bottom side thereof. An expansion ring is disposed in the engaging slot of the clutch member. The power transmission head base has a corresponding installation slot formed at a top side thereof, wherein the bottom side of clutch member is coupled at the top side of the power transmission head base, the expansion ring is engaged between an inner wall of the installation slot and an outer wall of the engaging slot, so as to enable the rotational movement between the power transmission head base and the clutch member. This feature enables the clutch member to be detachably coupled with the power transmission head base, so as to allow the adjustment of the clutch member to the power transmission head base. In addition, the structural configuration of the clutch member is simple and the installation process of the clutch member is relatively easy.

Another advantage of the invention is to provide an operational control assembly, which comprises a tapping operational handle operatively coupled at the power drilling head, wherein during the tapping operation, the power drilling head is directly operated and controlled by the tapping operation handle. Therefore, the operator is able to actuate the tapping operation handle to controllably drop down the power drilling head. Since the downward pressure of the power drilling head is controllable, the reaction force at the tap is limited to prevent the tap being bumped with the hole, so as to prevent the tap being broken. These are the key factors suitable for the power drilling head to precisely and rapidly form the hole within a diameter range of 0.5 to 3 mm during the tapping operation.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
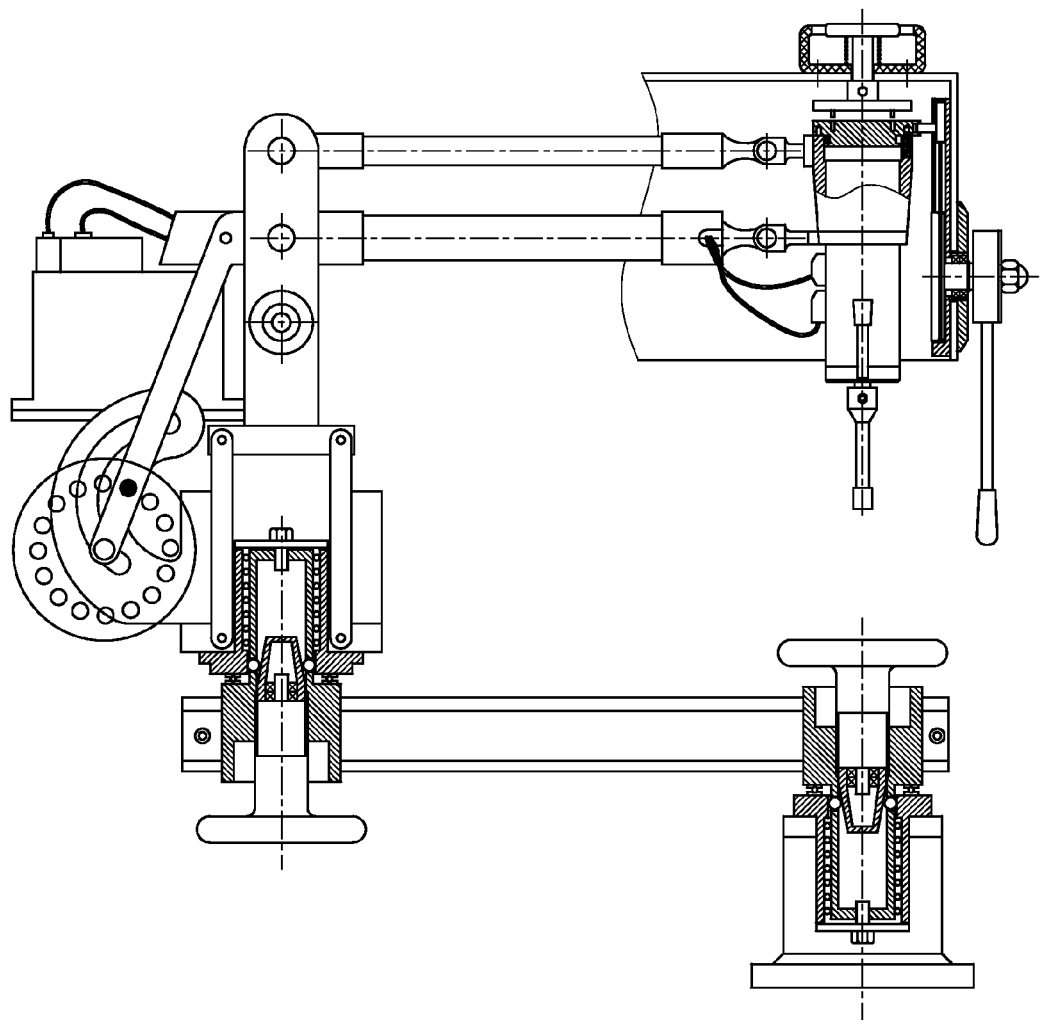
FIG. 1 is a schematic view of a drilling and tapping machine equipped with an operational control assembly according to a preferred embodiment of the present invention.
Figure 2:
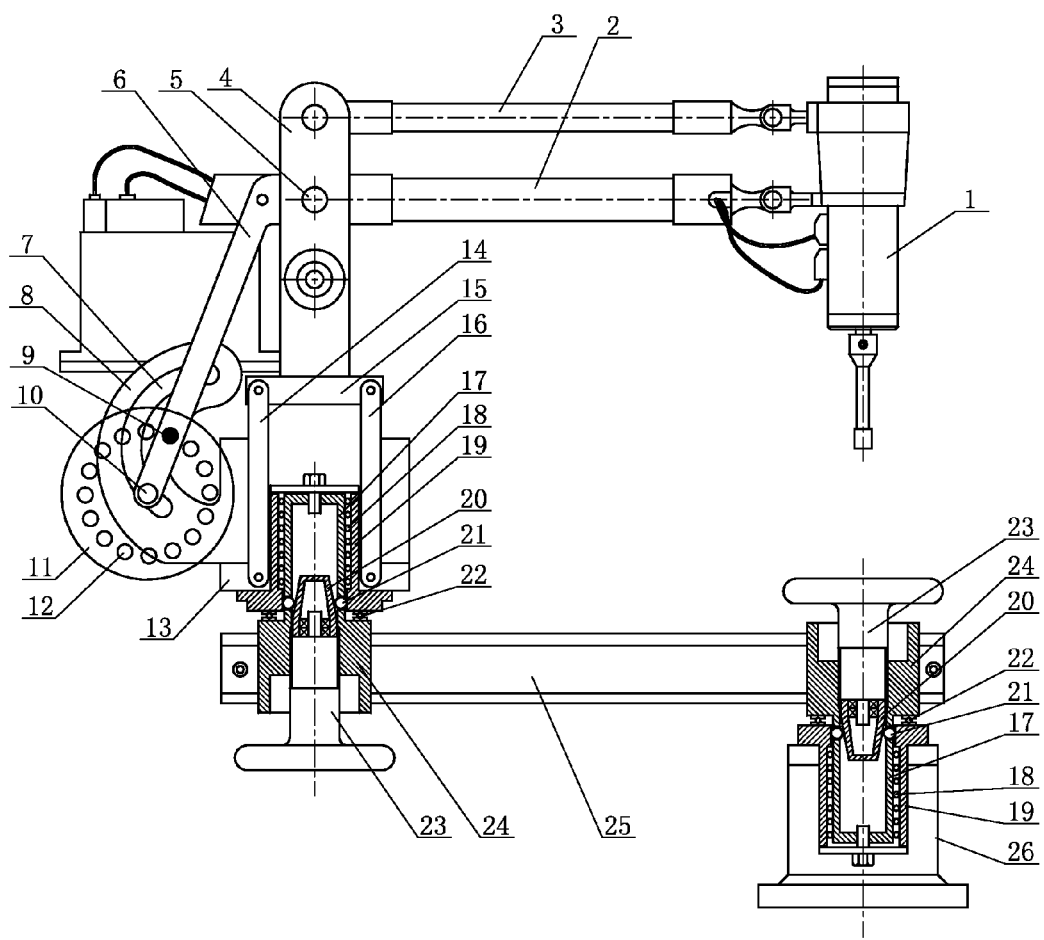
FIG. 2 is a schematic view of the drilling and tapping machine according to the above preferred embodiment of the present invention, illustrating the parallelogram arm structure and the counterweight configuration of the machine, wherein an operational control assembly is omitted in FIG. 2.
Figure 3:
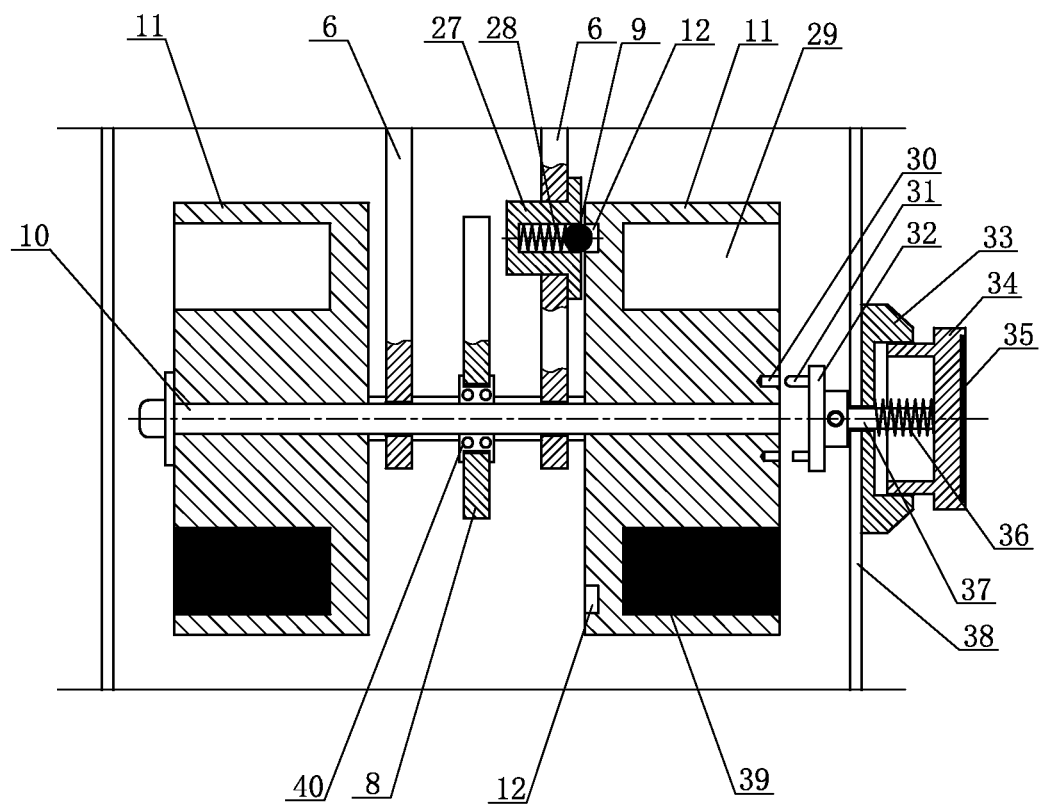
FIG. 3 is a sectional view of the weight adjustment unit of the drilling and tapping machine according to the above preferred embodiment of the present invention.

Referring to FIGS. 1 to 3 of the drawings, a drilling and tapping machine according to a preferred embodiment of the present invention is illustrated, wherein the machine comprises a power head assembly 1 supported at a vertical orientation, a head support comprising an upper head supporting arm 3 and a lower head supporting arm 2, and a supporting shaft 4 supported at a vertical orientation, wherein the upper and lower head supporting arms 3, 2 are pivotally and spacedly coupled between the power head assembly 1 and the supporting shaft 4. In other words, two ends of each of the upper and lower head supporting arms 3, 2 are pivotally coupled at the power head assembly 1 and the supporting shaft 4 respectively. Accordingly, the power head assembly 1, the lower head supporting arm 2, the upper head supporting arm 3, and the supporting shaft 4 form a parallelogram. The machine further comprises an arm base support which comprises a first base supporting arm 14, a second base supporting arm 16, a first base supporting platform 15 and a second base supporting platform 13. The first base supporting arm 14 and the second base supporting arm 16 have the same length and are supported at a vertical orientation. The first base supporting platform 15 and the second base supporting platform 13 are parallel with each other that the first base supporting platform 15 is located above the second base supporting platform 13. The supporting shaft 4 is perpendicularly and upwardly extended on the first base supporting platform 15. Accordingly, the first base supporting arm 14 and the second base supporting arm 16 are pivotally coupled between the first base supporting platform 15 and the second base supporting platform 13, such that two ends of each of the first and second base supporting arms 14, 16 are pivotally coupled at the first base supporting platform 15 and the second base supporting platform 13 respectively. In other words, the first base supporting arm 14, the second base supporting arm 16, the first base supporting platform 15, and the second base supporting platform 13 also form a parallelogram. The machine further comprises a swing arm 25 and a base station 26, wherein the swing arm 25 is movably extended from the base station 26 to couple with the second base supporting platform 13. The swing arm 25 is supported in a horizontal orientation. The machine further comprises an arm positioning assembly coupled with the head support and the arm base support for guiding corresponding movements of the head support and the arm base support so as to ensure a vertical trajectory of the power head assembly. The arm positioning assembly comprises a guiding member 8, having an arc-shaped guiding slot 7, coupled at the second base supporting platform 13, a bearing unit 40 operatively provided in the guiding slot 7, a guiding axle 10 operatively extended through the bearing unit 40 to slidably engage at the guiding slot 7, and a control arm 6 extended from the guiding axle 10 to the lower head supporting arm 2. Accordingly, through the arm positioning assembly, the power head assembly 1 can be absolutely moved at a vertical orientation. In particular, the second base supporting platform 13 is stationary that when the guiding axle 10 is slid along the guiding slot 7 to actuate the control arm 6, the first and second base supporting arms 14, 16 are pivotally and correspondingly moved while the upper and lower head supporting arms 3, 2 are pivotally and correspondingly moved to ensure the power head assembly 1 to be absolutely moved at a vertical orientation and to ensure the vertical trajectory of the power head assembly 1. It is worth mentioning that the first and second base supporting arms 14, 16 are moved parallelly and the upper and lower head supporting arms 3, 2 are moved parallelly.

The machine further comprises a weighting wheel 11, wherein the guiding axle 10 is coupled at the weighting wheel 11 at a center thereof. Accordingly, the control arm 6 is extended to the lower head supporting arm 2 end-to-end to form a lever arm. Preferably, the control arm 6 is integrally extended to the lower head supporting arm 2 to form a one piece integrated lever arm. The lever arm has a lever fulcrum 5 defined at an extension point between the control arm 6 and the lower head supporting arm 2, wherein the lever fulcrum 5 is also a point where the lower head supporting arm 2 pivotally connects to the supporting shaft 4. Accordingly, one end of the lever arm is coupled at the weighting wheel 11 and an opposed end of the lever arm is coupled to the power head assembly 1. The leverage moment of the lever arm at the weighting wheel 11 is larger than the leverage moment of the lever arm at the power head assembly 1. According to the preferred embodiment, the weight of the weighting wheel 11 can be selectively adjusted via a weight adjustment unit. The weight adjustment unit has a plurality of weight receiving cavities 29, preferably eight cavities, radially formed at a peripheral portion of the weighting wheel 11, and comprises a plurality of weighting elements 39 selectively disposed in the weight receiving cavities 29 to configure a weight distribution of the weighting wheel 11 with an eccentric weight. The weight adjustment unit further comprises a weight indexing unit and a weight adjustor. The weight indexing unit comprises an indexing spring holder 27 having a cavity coupled at the control arm 6, an indexing spring 28 disposed in the indexing spring holder 27, an indexing element 9 having a ball shape disposed at the indexing spring holder 27 and supported by the indexing spring 28, and a plurality of indexing indentions 12 spacedly and radially formed at the surface of the weighting wheel 11. Accordingly, the weight receiving cavities 29 are formed at one side of the weighting wheel 11 while the indexing indentions 12 are formed at the opposed side of the weighting wheel 11. Preferably, there are twelve indexing indentions 12 formed at the weighting wheel 11 in the radial distribution configuration. According to the preferred embodiment, the indexing element 9 is pushed by the indexing spring holder 27 to bias against the surface of the weighting wheel 11 at one of the indexing indentions 12 to index the position of the weighting wheel 11. The weight adjustor comprises a weight adjusting handwheel 34, a weight adjusting seat 33, a weight adjusting spring 36, a weight adjusting shaft 37, and a weight adjusting clutch 32. The weight adjusting seat 33 is coupled at a machine housing 38 at an exterior side thereof, wherein the weight adjusting handwheel 34 is rotatably and slidably coupled at the weight adjusting seat 33. A weight distribution dial 35 is provided at an outer side of the weight adjusting handwheel 34. The weight adjusting spring 36 is supported between the weight adjusting seat 33 and the weight adjusting handwheel 34, wherein the weight adjusting spring 36 has two ends biasing against the weight adjusting seat 33 and the weight adjusting handwheel 34 respectively. The weight adjusting clutch 32, having at least two weight adjusting latches 31, is located at an interior side of the machine housing 38 at a position that the weight adjusting latches 31 are extended toward the weighting wheel 11, wherein the weight adjusting shaft 37 is extended from the weight adjusting handwheel 34 to the weight adjusting clutch 32 through the weight adjusting seat 33 and the machine housing 38. In particular, the weight adjusting spring 36 is coaxially coupled at the weight adjusting shaft 37. The weight adjustor further has at least two weight adjusting slots 30 formed at the surface of the weighting wheel 11. Accordingly, the two weight adjusting latches 31 have different lengths that one of the weight adjusting latches 31 (long weight adjusting latch 31) is longer than another weight adjusting latch 31 (short weight adjusting latch 31). Correspondingly, the weight adjusting slots 30 have different length that one of the weight adjusting slots 30 (long weight adjusting slot 30) is longer than another weight adjusting slot 30 (short weight adjusting slot 30). In other words, the long weight adjusting latch 31 can only insert into the long weight adjusting slot 30. When the long weight adjusting latch 31 is inserted into the long weight adjusting slot 30, the short weight adjusting latch 31 will be automatically aligned with and inserted into the short weight adjusting slot 30. According to the preferred embodiment, when the weight adjusting handwheel 34 is pushed by the operator to push the weight adjusting clutch 32 to the weighting wheel 11, the weight adjusting latches 31 are correspondingly engaged with the weight adjusting slots 30, so as to engage the weight adjusting clutch 32 with the weighting wheel 11. Then, the weight adjusting handwheel 34 is rotated to drive the weighting wheel 11 to rotate to control the weight distribution of the weighting wheel 11. The weight distribution of the weighting wheel 11 can be indicated by the weight distribution dial 35. It is worth mentioning that when the weighting wheel 11 is driven to rotate, the indexing element 9 is pushed by the indexing spring holder 27 to disengage with one of the indexing indentions 12 and to reengage with another indexing indention 12, so as to index the weight level of the weighting wheel 11. Once the weight distribution of the weighting wheel 11 is set, the pushing force at the weight adjusting handwheel 34 can be released. Therefore, the weight adjusting spring 36 will push the weight adjusting handwheel 34 away from the weight adjusting seat 33. As a result, the weight adjusting clutch 32 is moved away from the weighting wheel 11 to disengage the weight adjusting latches 31 from the weight adjusting slots 30.

The machine of the present invention further comprises a locking mechanism for selectively locking the swing arm 25 at the arm base support. In particular, the locking mechanism is arranged to lock up the movement of the swing arm 25 at the second base supporting platform 13. Accordingly, the locking mechanism comprises a threaded locking base 24, a threaded adjusting shaft 23, and a locking sleeve 19. The locking sleeve 19 is coupled at the second base supporting platform 13. The threaded locking base 24 is coupled at the swing arm 25, wherein the swing arm 25 is movable with respect to the threaded locking base 24. A bearing device 22 is supported at a horizontal orientation and is located between a bottom side of the locking sleeve 19 and an upper side of the threaded locking base 24 to enable the rotational movement of the locking sleeve 19 on the threaded locking base 24. Accordingly, an upper portion of the threaded locking base 24 has a sleeve portion 17 to define a shoulder portion where the bearing device 22 is supported thereon, wherein the sleeve portion 17 is coaxially received in the locking sleeve 19. A shaft bearing 18 is coaxially coupled between an inner surface of the locking sleeve 19 and an outer surface of the sleeve portion 17 of the threaded locking base 24 to enable the sleeve portion 17 to be rotated within the locking sleeve 19. The threaded locking base 24 further has a plurality of through locking holes formed at the sleeve portion 17 above the bearing device 22, wherein a plurality of locking elements 21 are located at the locking holes of the sleeve portion 17 respectively. Preferably, each of the locking elements 21 is a metal ball made of steel. The threaded adjusting shaft 23 is rotatably coupled at the threaded locking base 24 and is upwardly extended from the bottom side of the threaded locking base 24. The locking mechanism further comprises a locking actuator 20 upwardly extended from the top end of the threaded adjusting shaft 23, wherein the locking actuator 20 has a conical shape that a size of the locking actuator 20 is gradually reduced from bottom to top. The locking actuator 20 is slidably and coaxially coupled within the sleeve portion 17 in a vertical direction along an axis of the sleeve portion 17. When the threaded adjusting shaft 23 is rotated at one direction, the locking actuator 20 is driven to move upwardly so as to push the locking elements 21 outwardly and radially through the locking holes until the locking elements 21 bias against the inner surface of the locking sleeve 19. As a result, the locking sleeve 19 is locked up at the threaded locking base 24, so as to lock up the movement of the swing arm 25 at the second base supporting platform 13. In other words, when the threaded adjusting shaft 23 is rotated at an opposite direction, the locking actuator 20 is driven to move downwardly, such that the locking elements 21 are free to move in the locking holes to disengage the locking elements 21 from the inner surface of the locking sleeve 19. As a result, the swing arm 25 is free to move with respect to the second base supporting platform 13.

The machine further comprises a swing arm locking assembly for selectively locking the swing arm 25 with the base station 26. The swing arm locking assembly has the same structural configuration of the locking mechanism, wherein the swing arm locking assembly also comprises the threaded locking base 24, the threaded adjusting shaft 23, and the locking sleeve 19. The locking sleeve 19 is coupled at the base station 26. The threaded locking base 24 is coupled at the swing arm 25, wherein the swing arm 25 is movable with respect to the threaded locking base 24, such that two end portions of the swing arm 25 are movably coupled with two threaded locking bases 24 of two locking mechanisms respectively. The bearing device 22 of the swing arm locking assembly is supported at a horizontal orientation and is located between an upper side of the locking sleeve 19 and a bottom side of the threaded locking base 24 to enable the rotational movement of the locking sleeve 19 on the threaded locking base 24. Accordingly, a lower portion of the threaded locking base 24 has a sleeve portion 17 to define a shoulder portion where the bearing device 22 is supported thereat, wherein the sleeve portion 17 is coaxially received in the locking sleeve 19. The shaft bearing 18 of the swing arm locking assembly is coaxially coupled between an inner surface of the locking sleeve 19 and an outer surface of the sleeve portion 17 of the threaded locking base 24 to enable the sleeve portion 17 to be rotated within the locking sleeve 19. The threaded locking base 24 further has a plurality of through locking holes formed at the sleeve portion 17 below the bearing device 22, wherein the locking elements 21 of the swing arm locking assembly are located at the locking holes of the sleeve portion 17 respectively. Preferably, each of the locking elements 21 is a metal ball made of steel. The threaded adjusting shaft 23 is rotatably coupled at the threaded locking base 24 and is downwardly extended from the bottom side of the threaded locking base 24. The locking actuator 20 of the swing arm locking assembly is downwardly extended from the bottom end of the threaded adjusting shaft 23, wherein the locking actuator 20 of the swing arm locking assembly has a conical shape that a size of the locking actuator 20 is gradually reduced from top to bottom. The locking actuator 20 is slidably and coaxially coupled within the sleeve portion 17 in a vertical direction along an axis of the sleeve portion 17. When the threaded adjusting shaft 23 is rotated at one direction, the locking actuator 20 is driven to move downwardly so as to push the locking elements 21 outwardly and radially through the locking holes until the locking elements 21 bias against the inner surface of the locking sleeve 19. As a result, the locking sleeve 19 is locked up at the threaded locking base 24, so as to lock up the movement of the swing arm 25 at the base station 26. In other words, when the threaded adjusting shaft 23 is rotated at an opposite direction, the locking actuator 20 is driven to move upwardly, such that the locking elements 21 are free to move in the locking holes to disengage the locking elements 21 from the inner surface of the locking sleeve 19. As a result, the swing arm 25 is free to move with respect to the base station 26.

The machine of the present invention is designed for the power head assembly 1 to drill a hole with a diameter between 0.5 and 3 mm during the tapping operation and drilling operation. The machine employs a parallelogram arm structure to ensure the vertical movement of the power head assembly 1 and a counterweight configuration to balance and control the vertical movement of the power head assembly 1. In particular, through the parallelogram arm structure, the power head assembly 1 is controllably and absolutely moved at a vertical orientation during the tapping operation. As a result, no transverse force will be exerted to the drill and tap at the power head assembly 1 during the tapping operation or the drilling operation. The parallelogram arm structure of the present invention will ensure and maintain the power head assembly 1 in a vertically movable orientation. In other words, the parallelogram arm structure of the present invention will correct the deviated orientation of the power head assembly 1. Since the movement of the parallelogram arm structure is controlled and guided by the guiding slot 7, the arms in the parallelogram arm structure will be synchronizedly moved to ensure the vertical trajectory of the power head assembly 1.

Through the counterweight configuration of the present invention, the power head assembly 1 is lifted up back to its original position via the action of the lever after the tapping operation or the drilling operation. Since the leverage moment of the lever arm at the weighting wheel 11 can be set to slightly larger than the leverage moment of the lever arm at the power head assembly 1, the power head assembly 1 is lifted up slowly by a relatively small returning force for the tapping operation or the drilling operation. In other words, the returning force at the power head assembly 1 will be small and stable to prevent the screw and tap being broken after the small hole with a diameter from 0.5 to 3 mm is formed. In fact, the counterweight configuration of the present invention can incorporate with the power head assembly 1 to make any size of the drilling hole. By selectively adjusting the counterweight at one end of the lever, an optimized returning force at the power head assembly 1 can be determined for different sizes of hole during the tapping operation or the drilling operation. Preferably, parameters of the counterweight and the returning force can be converted into a digital form and can be saved in a CPU of a computerized control center, such that the operator is able to select any optimized parameters for the power head assembly 1 during tapping operation or the drilling operation.

Figure 4:
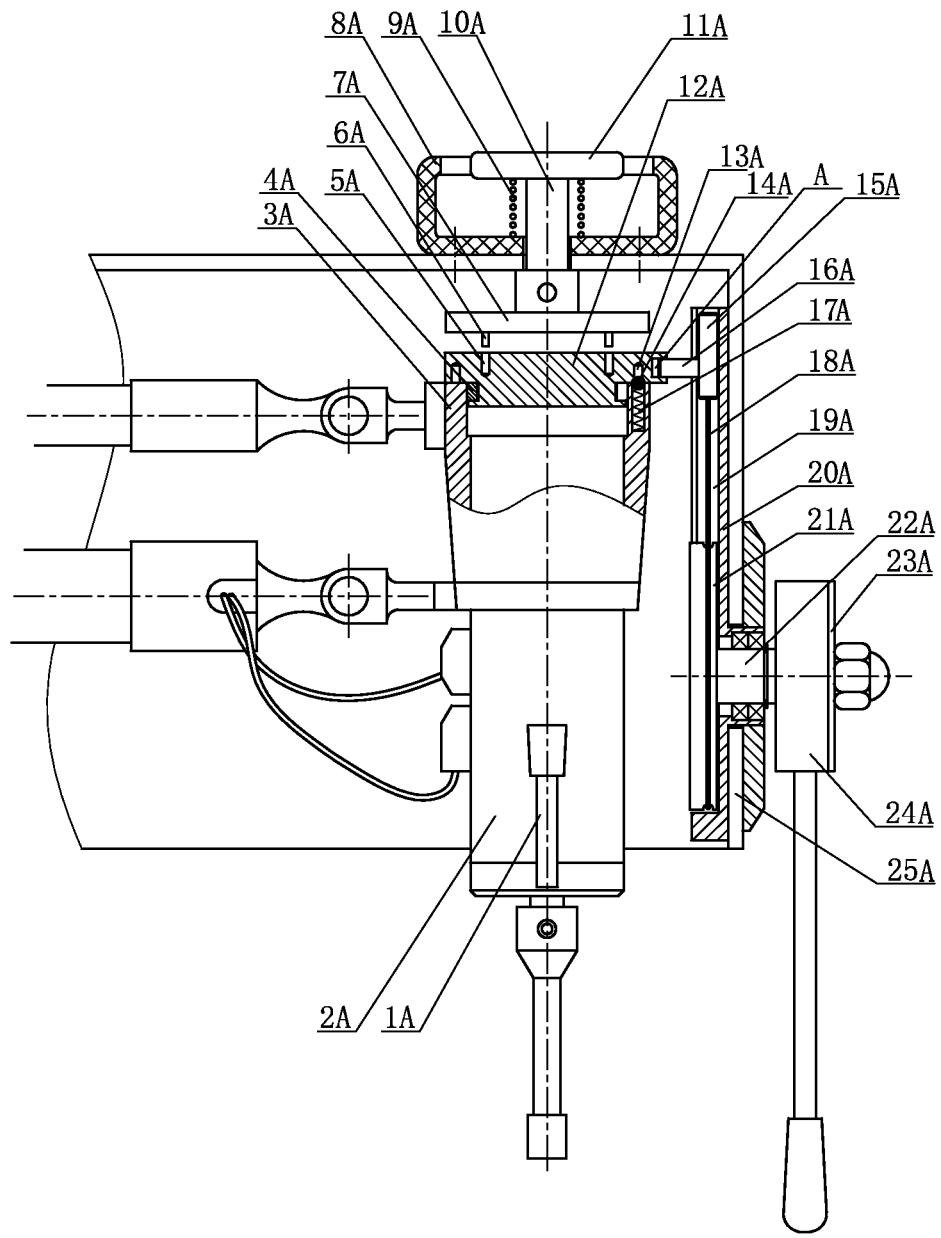
FIG. 4 is a sectional view of the operation control assembly of the drilling and tapping machine according to the above preferred embodiment of the present invention.
Figure 5:
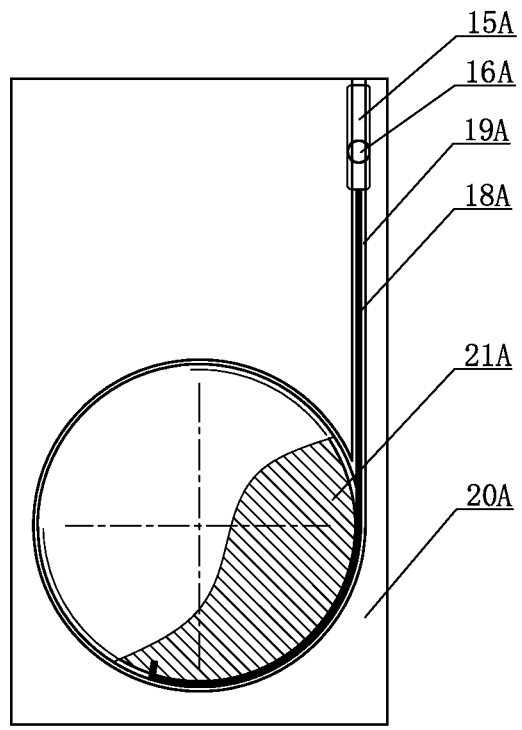
FIG. 5 illustrates an operation of the operation control assembly of the drilling and tapping machine according to the above preferred embodiment of the present invention.

Referring to FIGS. 1, 4, and 5 of the drawings, an operational control assembly of the drilling and tapping machine according to a preferred embodiment of the present invention is illustrated, wherein the operational control assembly comprises a drilling operational handle 24A, a tapping operational handle 1A operatively coupled at a power drilling head 2A of a power head assembly, a retention panel 20A, a wheel pulley 21A, a slider member 15A, and a clutch member 12A. The power head assembly further comprises a power transmission head base 3A, wherein the power drilling head 2A is coupled at a bottom of the power transmission head base 3A. The retention panel 20A is coupled at a sidewall of a head casing 25A at an interior thereof and is supported adjacent to the power head assembly, wherein the retention panel 20A has a wheel cavity formed at one side thereof. The power drilling head 2A of the power head assembly is downwardly extended from the head casing 25A. The wheel pulley 21A is rotatably coupled at the retention panel 20A within the wheel cavity, wherein a handle axle 22A of the drilling operational handle 24A is coaxially coupled with the wheel pulley 21A through the retention panel 20A, such that when the drilling operational handle 24A is pivotally moved with respect to the retention panel 20A, the wheel pulley 21A is driven to rotate within the wheel cavity. In other words, when the drilling operational handle 24A is pivotally and downwardly moved, the wheel pulley 21A is driven to rotate at one direction. Likewise, when the drilling operational handle 24A is pivotally and upwardly moved, the wheel pulley 21A is driven to rotate at an opposite direction. A dial 23A with indicators formed thereon is coaxially coupled at the handle axle 22A of the drilling operational handle 24A to indicate the pivotal movement thereof. A sliding slot 19A is formed in the head casing 25A at one side of the retention panel 20A to communicate with the wheel cavity. Preferably, the sliding slot 19A is a vertical slot formed at an inner side of the retention panel 20A and is extended tangentially to the wheel cavity. The slider member 15A is sidably engaged with the sliding slot 19A, such that the slider member 15A is actuated to slide along the sliding slot 19A at a vertical direction. The slider member 15A comprises a connector 16A sidewardly extended therefrom to selectively engaged with the power head assembly through the clutch member 12A. A tensional cable 18A, which is made of steel and has a predetermined length, is supported along the sliding slot 19A in tension manner, wherein the tensional cable 18A is linked between the drilling head and the drilling operational handle 24A. In particular, the tensional cable 18A has an upper end affixed to the slider member 15A at a bottom portion thereof, and a lower end affixed to the wheel pulley 21A, such that when the wheel pulley 21A is rotated by the drilling operational handle 14A, a portion of the tensional cable 18A is wound around the wheel pulley 21A to drive the drilling head downward. The clutch member 12A, which is embodied as a clutch plate, is rotatably coupled on top of the power transmission head base 3A of the power head assembly. In particular, the clutch member 12A has a circular engaging slot formed at a bottom side thereof, wherein an expansion ring 4A is disposed in the engaging slot of the clutch member 12A. The power transmission head base 3A has a corresponding installation slot formed at a top side thereof, wherein the bottom side of clutch member 12A is coupled at the top side of the power transmission head base 3A of the power head assembly, the expansion ring 5A is engaged between an inner wall of the installation slot and an outer wall of the engaging slot, so as to enable the rotational movement between the power transmission head base 3A and the clutch member 12A. The clutch member 12A further has a clutch slot A formed at a lateral side thereof, wherein the connector 16A is selectively engage with the clutch slot A. Accordingly, at the drilling position of the power drilling head 2A of the power head assembly, i.e. the clutch member 12A is stationary before the rotation thereof, the connector 16A is engaged with the clutch slot A by inserting the connector 16A thereinto. At the tapping position of the power drilling head 2A of the power head assembly, i.e. after the rotation of the clutch member 12A, the connector 16A is disengaged with the clutch slot A.

The operational control assembly further comprises a rotation adjustor coupled at a top side of the head casing 25A for controllably adjusting a rotational position of the clutch member 12A. The rotation adjustor comprises a hand wheel 11A, a wheel base 8A, a resilient element 9A, an adjusting shaft 10A, and a coupling base 7A. The wheel base 8A is coupled at the top side of the head casing 25A to coaxially align with the clutch member 12A. The hand wheel 11A is rotatably coupled at the wheel base 8A. The resilient element 9A, preferably a compression spring, is supported within the wheel base 8A at a position that an upper end of the resilient element 9A is biased against a bottom of the hand wheel 11 while a lower end of the resilient element 9A is biased against a bottom wall of the wheel base 8A. The adjusting shaft 10A is coaxially extended from the wheel base 8A to the coupling base 7A through the wheel base 8A, wherein the adjusting shaft 10A is coaxially extended through the resilient element 9A. The bottom side of the coupling base 7A is coaxially aligned and faced toward the upper side of the clutch member 12A. The coupling base 7A comprises a plurality of coupling latches 6A spacedly and downwardly extended from the bottom side of the coupling base 7A, wherein the clutch member 12A further has a plurality of corresponding coupling slots 5 spacedly formed on the upper side of the clutch member 12A, such that the coupling latches 6A are detachably engaged with the coupling slots 5A respectively so as to couple the hand wheel 11A with the clutch member 12A. Accordingly, in order to adjust the rotational position of the clutch member 12A, the hand wheel 11A is manually pressed down to couple the coupling latches 6A with the coupling slots 5A, such that the hand wheel 11A is rotated to drive the clutch member 12A to rotate. Once the pressing force at the hand wheel 11A is released, the resilient force, i.e. the spring force, of the resilient element 9A will push the hand wheel 11A back to its original position to detach the coupling latches 6A from the coupling slots 5A. It is worth mentioning that the before and after rotational positions of the clutch member 12A is shown at the position indicators of the hand wheel 11A.

The operational control assembly further comprises a positioning unit for positioning the clutch member 12A, wherein the positioning unit comprises a spring element 17A and a positioning element 14A supported on the spring element 17A. The positioning element 14A is preferably a steel ball. The positioning unit further has two positioning slots 13A spacedly formed at the bottom side of the clutch member 12A, and a receiving slot formed at the upper side of the power transmission head base 3A, wherein the spring element 17A and the positioning element 14A are received in the receiving slot, such that the positioning element 14A is upwardly pushed by the spring element 17A to bias against the bottom side of the clutch member 12A at one of the positioning slots 13A. At the drilling position, i.e. before the clutch member 12A is rotated, the positioning element 14A is pushed to bias against the first positioning slot 13A. At the tapping position, i.e. after the clutch member 12A is rotated, the positioning element 14A is pushed to bias against the second positioning slot 13A. As a result, the clutch member 12A can be positioned at the drilling position and the tapping position via the rotation adjustor.

According to the preferred embodiment, the operation of the operational control assembly is illustrated as follows. At the drilling position of the clutch member 12A, the connector 16A is engaged with the clutch slot A. When the drilling operational handle 24A is pivotally moved by the hand of the operator, the wheel pulley 21A is driven to rotate. The slider member 15A is slid downwardly along the sliding slot 19A by the tensional cable 18A, so as to drive the power drilling head 2A of the power head assembly to move downward for tapping operation. Since the downward pressure of the drilling head can be directly transmitted to the drilling operational handle 24A via the tensional cable 18A, the operator can feel and control the downward pressure at the drilling operational handle 24A. In other words, the operator is able to apply a relatively light actuating force at the drilling operational handle 24A to pivotally pull the drilling operational handle 24A to generate a relatively small and stable controllable pressure to the drilling head, which is suitable for operating the screw tap to drill a drilling hole with a diameter from 0.5 to 3 mm on a workpiece. Once the drilling hole is formed, the drilling operational handle 24A can be easily and lightly moved back to its original position. In other words, the operator is able to control the returning force at the power drilling head 2A of the power head assembly to lift up the power drilling head 2A of the power head assembly. It is because the returning force is very limited via the tensional cable 18A and the wheel pulley 21A. Due to the tension of the tensional cable 18A, the returning force at the power drilling head 2A of the power head assembly will be small and stable to prevent the screw and tap being broken after the small hole with a diameter from 0.5 to 3 mm is formed. It is worth mentioning that at the tapping position of the clutch member 12A, the power drilling head 2A of the power head assembly is directly operated and controlled by the tapping operational handle 1A. Therefore, the operator is able to actuate the tapping operation handle 1A to controllably drop down the power drilling head 2A of the power head assembly. Since the downward pressure of the power drilling head 2A of the power head assembly is controllable, the reaction force at the tap is limited to prevent the tap being bumped with the hole, so as to prevent the tap being broken. These are the key factors suitable for the power drilling head 2A of the power head assembly to precisely and rapidly form the hole within a diameter range of 0.5 to 3 mm during the tapping operation.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A drilling and tapping machine, comprising:
a power head assembly supported at a vertical orientation;
a head support, formed in a parallelogram, movably coupled at said power head assembly, wherein said head support comprises an upper head supporting arm, a lower head supporting arm and a supporting shaft, wherein said lower head supporting arm has the same length of said upper head supporting arm and is parallel to said upper head supporting arm, wherein said upper and lower head supporting arms are pivotally and spacedly coupled between said power head assembly and said supporting shaft to form a parallelogram;
an arm base support, also formed in a parallelogram, movably coupled at said head support, wherein said supporting shaft of said head support is supported at a vertical orientation on said arm base support, wherein said arm base support comprises a first base supporting arm at a vertical orientation, a second base supporting arm which has the same length of said first base supporting arm and is parallel to said first base supporting arm, a first base supporting platform, and a second base supporting platform, wherein said supporting shaft is perpendicularly and upwardly extended on said first base supporting platform, wherein said first base supporting arm and said second base supporting arm are pivotally coupled between said first base supporting platform said and said second base supporting platform to form a parallelogram; and
an arm positioning assembly coupled with said head support and said arm base support for guiding corresponding movements of said head support and said arm base support so as to ensure a vertical trajectory of said power head assembly, wherein said arm positioning assembly comprises a guiding member, having an arc-shaped guiding slot, coupled at said second base supporting platform, a guiding axle slidably engaged at said guiding slot, and a control arm extended from said guiding axle to said lower head supporting arm, wherein said second base supporting platform is stationary that when said guiding axle is slid along said guiding slot to actuate said control arm, said head support and said arm base support are correspondingly moved to ensure said power head assembly to be absolutely moved at a vertical orientation and to ensure said vertical trajectory of said power head assembly.

2. The drilling and tapping machine, as recited in claim 1, further comprising a weighting wheel coupled at said guiding axle, wherein said control arm is extended to said lower head supporting arm end-to-end to form a lever arm that said lever arm has a lever fulcrum defined at a point where said lower head supporting arm pivotally connects to said supporting shaft, wherein one end of said lever arm is coupled at said weighting wheel and an opposed end of said lever arm is coupled to said power head assembly, wherein a leverage moment of said lever arm at said weighting wheel said is slightly larger than a leverage moment of said lever arm at said power head assembly.

3. The drilling and tapping machine, as recited in claim 2, further comprising weight adjustment unit which has a plurality of weight receiving cavities radially formed at a peripheral portion of said weighting wheel, and comprises a plurality of weighting elements selectively disposed in said weight receiving cavities to configure a weight distribution of said weighting wheel with an eccentric weight.

4. The drilling and tapping machine, as recited in claim 3, wherein said weight adjustment unit further comprises a weight indexing unit which comprises an indexing spring holder coupled at said control arm, an indexing spring disposed in said indexing spring holder, an indexing element disposed at said indexing spring holder and supported by said indexing spring, and a plurality of indexing indentions spacedly and radially formed at a surface of said weighting wheel, wherein said indexing element is pushed by said indexing spring holder to bias against said surface of said weighting wheel at one of said indexing indentions to index a position of said weighting wheel.

5. The drilling and tapping machine, as recited in claim 4, wherein said weight adjustment unit further comprises a weight adjustor which has two weight adjusting slots formed on said weight wheel, and comprises a weight adjusting seat, a weight adjusting handwheel rotatably and slidably coupled at said weight adjusting seat, a weight adjusting spring supported between said weight adjusting seat and said weight adjusting handwheel, a weight adjusting clutch having at least two weight adjusting latches toward said weighting wheel, and a weight adjusting shaft extended from said weight adjusting handwheel to said weight adjusting clutch through said weight adjusting seat, wherein when said weight adjusting handwheel is pushed to engage said weight adjusting latches with said weight adjusting slots, said weight adjusting handwheel is rotated to control said weight distribution of said weighting wheel.

6. The drilling and tapping machine, as recited in claim 5, wherein said weight adjusting latches have different lengths that one of the weight adjusting latches as a long weight adjusting latch is longer than another weight adjusting latch as a short weight adjusting latch, wherein said weight adjusting slots also have different length that one of said weight adjusting slots as a long weight adjusting slot is longer than another weight adjusting slot as a short weight adjusting slot, such that said long weight adjusting latch and said short weight adjusting latch are engaged with said long weight adjusting slot and said short weight adjusting slot respectively.

7. A drilling and tapping machine, comprising:
a power head assembly supported at a vertical orientation;
a head support, formed in a parallelogram, movably coupled at said power head assembly, wherein said head support comprises an upper head supporting arm, a lower head supporting arm and a supporting shaft, wherein said lower head supporting arm has the same length of said upper head supporting arm and is parallel to said upper head supporting arm, wherein said upper and lower head supporting arms are pivotally and spacedly coupled between said power head assembly and said supporting shaft to form a parallelogram;
an arm base support, also formed in a parallelogram, movably coupled at said head support, wherein said supporting shaft of said head support is supported at a vertical orientation on said arm base support, wherein said arm base support comprises a first base supporting arm at a vertical orientation, a second base supporting arm which has the same length of said first base supporting arm and is parallel to said first base supporting arm, a first base supporting platform, and a second base supporting platform, wherein said supporting shaft is perpendicularly and upwardly extended on said first base supporting platform, wherein said first base supporting arm and said second base supporting arm are pivotally coupled between said first base supporting platform said and said second base supporting platform to form a parallelogram;
an arm positioning assembly coupled with said head support and said arm base support for guiding corresponding movements of said head support and said arm base support so as to ensure a vertical trajectory of said power head assembly;
a base station and a swing arm which is supported in a horizontal orientation and is movably coupled between said arm base support and said base station; and
a locking mechanism for selectively locking said swing arm at said arm base support, wherein said locking mechanism comprises a threaded adjusting shaft, a threaded locking base, having a sleeve portion, coupled at said swing arm, a locking sleeve coupled at said second base supporting platform at a position that said sleeve portion is coaxially received in said locking sleeve, wherein said threaded locking base further comprises a plurality of through locking holes formed at said sleeve portion, and a plurality of locking elements are located at said locking holes of said sleeve portion respectively, wherein said threaded adjusting shaft is rotatably coupled at said threaded locking base and is upwardly extended from a bottom side of said threaded locking base to lock up said locking sleeve at the threaded locking base when said threaded adjusting shaft is rotatably moved upward.

8. The drilling and tapping machine, as recited in claim 7, wherein said locking mechanism further comprises a locking actuator, having conical shape, upwardly extended from said threaded adjusting shaft, wherein said locking actuator is slidably and coaxially coupled within said sleeve portion in a vertical direction along an axis of said sleeve portion, in such a manner that when said threaded adjusting shaft is rotated at one direction, said locking actuator is driven to move upwardly to push said locking elements outwardly and radially through said locking holes until the locking elements bias against an inner surface of said locking sleeve to lock up said locking sleeve at said threaded locking base, so as to lock up a movement of said swing arm at said second base supporting platform.

9. A drilling and tapping machine, comprising:
a power head assembly supported at a vertical orientation;
a head support, formed in a parallelogram, movably coupled at said power head assembly, wherein said head support comprises an upper head supporting arm, a lower head supporting arm and a supporting shaft, wherein said lower head supporting arm has the same length of said upper head supporting arm and is parallel to said upper head supporting arm, wherein said upper and lower head supporting arms are pivotally and spacedly coupled between said power head assembly and said supporting shaft to form a parallelogram;
an arm base support, also formed in a parallelogram, movably coupled at said head support, wherein said supporting shaft of said head support is supported at a vertical orientation on said arm base support, wherein said arm base support comprises a first base supporting arm at a vertical orientation, a second base supporting arm which has the same length of said first base supporting arm and is parallel to said first base supporting arm, a first base supporting platform, and a second base supporting platform, wherein said supporting shaft is perpendicularly and upwardly extended on said first base supporting platform, wherein said first base supporting arm and said second base supporting arm are pivotally coupled between said first base supporting platform said and said second base supporting platform to form a parallelogram;
an arm positioning assembly coupled with said head support and said arm base support for guiding corresponding movements of said head support and said arm base support so as to ensure a vertical trajectory of said power head assembly;
a base station and a swing arm which is supported in a horizontal orientation and is movably coupled between said arm base support and said base station; and
a swing arm locking assembly for selectively locking said swing arm at said base station, wherein said swing arm locking assembly comprises a threaded adjusting shaft, a threaded locking base, having a sleeve portion, coupled at said swing arm, a locking sleeve coupled at said base station at a position that said sleeve portion is coaxially received in said locking sleeve, wherein said threaded locking base further comprises a plurality of through locking holes formed at said sleeve portion, and a plurality of locking elements are located at said locking holes of said sleeve portion respectively, wherein said threaded adjusting shaft is rotatably coupled at said threaded locking base and is downwardly extended from an upper side of said threaded locking base to lock up said locking sleeve at the threaded locking base when said threaded adjusting shaft is rotatably moved downward.

10. The drilling and tapping machine, as recited in claim 9, wherein said swing arm locking assembly further comprises a locking actuator, having conical shape, downwardly extended from said threaded adjusting shaft, wherein said locking actuator is slidably and coaxially coupled within said sleeve portion in a vertical direction along an axis of said sleeve portion, in such a manner that when said threaded adjusting shaft is rotated at one direction, said locking actuator is driven to move downwardly to push said locking elements outwardly and radially through said locking holes until the locking elements bias against an inner surface of said locking sleeve to lock up said locking sleeve at said threaded locking base, so as to lock up a movement of said swing arm at said base station.

11. A drilling and tapping machine, comprising:
a power head assembly supported at a vertical orientation;
a head support, formed in a parallelogram, movably coupled at said power head assembly;
an arm base support, also formed in a parallelogram, movably coupled at said head support;
an arm positioning assembly coupled with said head support and said arm base support for guiding corresponding movements of said head support and said arm base support so as to ensure a vertical trajectory of said power head assembly; and
an operational control assembly which comprises a drilling operational handle, a wheel pulley being driven to rotate by said drilling operational handle, and a tensional cable linked between said power head assembly and said wheel pulley, wherein when said drilling operational handle is actuated to drive said wheel pulley to rotate, said power head assembly is dropped down via said tensional cable for a drilling operation of said power head assembly.

12. The drilling and tapping machine, as recited in claim 11, wherein said operational control assembly further comprises a tapping operational handle operatively coupled at said power head assembly, wherein said power head assembly is directly operated to be dropped down and controlled by said tapping operational handle during a tapping operation of said power head assembly.

13. The drilling and tapping machine, as recited in claim 12, wherein said operational control assembly further comprises a slider member having a connector selectively engaged with said power head assembly, wherein said tensional cable has an upper end affixed to said slider member and a lower end affixed to said wheel pulley, such that when said connector is engaged with said power head assembly, said wheel pulley is rotated to pull said power head assembly downwardly via said tensional cable, wherein when said connector is disengaged with said power head assembly, said power head assembly dropped downwardly via said tapping operational handle.

14. The drilling and tapping machine, as recited in claim 13, wherein said operational control assembly further comprises a retention panel supported adjacent to said power head assembly to define a wheel cavity and a sliding slot extended tangentially to said wheel cavity, wherein said wheel pulley is rotatably supported in said wheel cavity and said tensional cable is extended along said sliding slot.

15. The drilling and tapping machine, as recited in claim 14, wherein said operational control assembly further comprises a clutch member having a clutch slot, wherein said power head assembly comprises a power drilling head and a power transmission head base coupled between a bottom side of said clutch member and a top side of said power drilling head, wherein said connector is selectively engaged with said clutch slot of said clutch member to selectively engaged said slider member with said power head assembly through said clutch member.

16. The drilling and tapping machine, as recited in claim 15, wherein said operational control assembly further has a plurality of coupling slots formed at said clutch member, and comprises a rotation adjustor coupled at a top side of said head casing for controllably adjusting a rotational position of said clutch member, wherein said rotation adjustor comprises a wheel base, a hand wheel rotatably coupled at said wheel base, a resilient element supported between said wheel base and said hand wheel, a coupling base having a plurality of coupling latches extended toward said clutch member, and an adjusting shaft extended from said hand wheel to said coupling base through said wheel base, such that when said hand wheel is pressed to drive said coupling base to couple said coupling latches with the coupling slots, said hand wheel is rotated to drive said clutch member to rotate.

17. The drilling and tapping machine, as recited in claim 16, wherein said operational control assembly further comprises a positioning unit for positioning said clutch member between a drilling position and a tapping position, wherein said positioning unit comprises a spring element and a positioning element supported on said spring element, wherein said positioning unit further has two positioning slots spacedly formed at a bottom side of said clutch member, and a receiving slot formed at an upper side of said power head assembly, wherein said spring element and said positioning element are received in said receiving slot, such that said positioning element is upwardly pushed by said spring element to bias against said bottom side of said clutch member at one of said positioning slots so as to indicate said clutch member at one of said drilling position and said tapping position.

* * * * *